United States Patent
Oka

(10) Patent No.: US 10,821,974 B2
(45) Date of Patent: Nov. 3, 2020

(54) LANE DEPARTURE AVOIDANCE APPARATUS

(71) Applicant: DENSO CORPORATION, Kariya (JP)

(72) Inventor: Kazumichi Oka, Kariya (JP)

(73) Assignee: DENSO CORPORATION, Kariya (JP)

( * ) Notice: Subject to any disclaimer, the term of this patent is extended or adjusted under 35 U.S.C. 154(b) by 294 days.

(21) Appl. No.: 15/740,321

(22) PCT Filed: Jun. 27, 2016

(86) PCT No.: PCT/JP2016/069003
§ 371 (c)(1),
(2) Date: Dec. 27, 2017

(87) PCT Pub. No.: WO2017/002758
PCT Pub. Date: Jan. 5, 2017

(65) Prior Publication Data
US 2018/0170378 A1   Jun. 21, 2018

(30) Foreign Application Priority Data
Jun. 29, 2015   (JP) ................................. 2015-130159

(51) Int. Cl.
| | |
|---|---|
| *B60W 30/12* | (2020.01) |
| *B62D 15/02* | (2006.01) |
| *G08G 1/16* | (2006.01) |
| *B60W 30/18* | (2012.01) |
| *B60W 40/072* | (2012.01) |

(Continued)

(52) U.S. Cl.
CPC ...... *B60W 30/12* (2013.01); *B60W 30/18145* (2013.01); *B60W 40/072* (2013.01); *B62D 15/025* (2013.01); *G06K 9/00798* (2013.01); *G08G 1/167* (2013.01); *B60W 40/114* (2013.01);
(Continued)

(58) Field of Classification Search
CPC ............... B60W 30/12; B60W 40/072; B60W 30/18145; B60W 2552/30; B60W 2420/42; B60W 40/114; G08G 1/167; B62D 15/025; G06K 9/00798
See application file for complete search history.

(56) References Cited

U.S. PATENT DOCUMENTS

| | | | | |
|---|---|---|---|---|
| 7,200,478 | B2 * | 4/2007 | Iwasaka | ............ B60T 8/17557 348/148 |
| 7,212,901 | B2 * | 5/2007 | Sadano | .................... B60T 7/22 348/148 |

(Continued)

FOREIGN PATENT DOCUMENTS

| | | |
|---|---|---|
| JP | 2003-016593 | 1/2003 |
| JP | 2008-168684 | 7/2008 |

(Continued)

*Primary Examiner* — Frederick M Brushaber
(74) *Attorney, Agent, or Firm* — Maschoff Brennan

(57) ABSTRACT

A lane departure avoidance apparatus characterized by including a control performing unit performing control to acquire a position of a subject vehicle in a lane in which the subject vehicle is traveling and to prevent departure from the lane, from when a control start condition is satisfied until a control end condition is satisfied, a curvature acquiring unit acquiring a curvature of the lane, and a condition setting unit setting the control start condition or the control end condition based on the curvature acquired by the curvature acquiring unit.

4 Claims, 13 Drawing Sheets

(51) Int. Cl.
*G06K 9/00* (2006.01)
*B60W 40/114* (2012.01)

(52) U.S. Cl.
CPC ..... *B60W 2420/42* (2013.01); *B60W 2552/30* (2020.02)

(56) References Cited

U.S. PATENT DOCUMENTS

| | | | | |
|---|---|---|---|---|
| 7,263,424 | B2* | 8/2007 | Motoyama | B60K 23/04 |
| | | | | 116/36 |
| 7,266,436 | B2* | 9/2007 | Shirato | B62D 1/286 |
| | | | | 348/148 |
| 7,424,364 | B2* | 9/2008 | Gern | B60W 40/08 |
| | | | | 701/301 |
| 7,801,657 | B2* | 9/2010 | Piyabongkarn | F16H 48/08 |
| | | | | 701/82 |
| 8,150,581 | B2* | 4/2012 | Iwazaki | B62D 15/025 |
| | | | | 701/42 |
| 9,855,948 | B2* | 1/2018 | Inomata | B60W 30/12 |
| 10,046,793 | B2* | 8/2018 | Green | B60W 50/082 |
| 2005/0096828 | A1* | 5/2005 | Uemura | B60T 8/17557 |
| | | | | 701/70 |
| 2006/0015239 | A1* | 1/2006 | Higuchi | B60T 7/12 |
| | | | | 701/72 |
| 2011/0015850 | A1 | 1/2011 | Tange et al. | |
| 2015/0371542 | A1* | 12/2015 | Fujishiro | B60Q 9/00 |
| | | | | 701/41 |
| 2016/0314360 | A1* | 10/2016 | Kizumi | G06K 9/00798 |
| 2016/0368534 | A1* | 12/2016 | Harda | G06K 9/00798 |
| 2017/0061797 | A1* | 3/2017 | Lee | G08G 1/167 |
| 2018/0037260 | A1* | 2/2018 | Otake | B62D 15/025 |
| 2018/0072297 | A1* | 3/2018 | Ito | F02D 13/0261 |
| 2018/0134290 | A1* | 5/2018 | Kataoka | B60W 30/12 |

FOREIGN PATENT DOCUMENTS

| | | |
|---|---|---|
| JP | 2009-234560 A | 10/2009 |
| JP | 2010-036645 A | 2/2010 |
| JP | 2010-058739 A | 3/2010 |
| JP | 2010-076539 A | 4/2010 |
| JP | 2016-007894 A | 1/2016 |
| WO | 2013/132961 A1 | 9/2013 |

* cited by examiner

LANE DEPARTURE AVOIDANCE APPARATUS

CROSS-REFERENCE TO RELATED APPLICATION

This application is based on Japanese Patent Application No. 2015-130159 filed on Jun. 29, 2015, the contents of which are incorporated herein by reference.

TECHNICAL FIELD

The present invention relates to a lane departure avoidance apparatus.

BACKGROUND ART

Conventionally, a lane departure avoidance apparatus which performs steering control to acquire the position of a subject vehicle in a traveling lane and to steer the vehicle in a direction in which the vehicle is prevented from departing from the lane (see PTL1).

The above-described steering control continues from when a control start condition is satisfied until a control end condition is satisfied. An example of the control start condition is that a distance between the subject vehicle and a lane boundary line (a lateral position) is smaller than a predetermined threshold. An example of the control end condition is that the lateral position is larger than the predetermined threshold.

CITATION LIST

Patent Literature

[PTL1] JP2010-58739A

SUMMARY OF THE INVENTION

Technical Problem

The lateral position is more likely to vary and the above-described control start condition and control end condition are more likely to be satisfied when the subject vehicle is traveling round a curve with a large curvature than when the subject vehicle is traveling straight ahead or around a curve with a small curvature. Thus, a driver of the subject vehicle may have an uncomfortable feeling that a start timing and an end timing for the steering control are earlier when the subject vehicle is traveling around a curve with a large curvature than when the subject vehicle traveling straight ahead or around a curve with a small curvature.

The present invention has been developed in view of the above-described circumstances. An object of the present invention is to provide a lane departure avoidance apparatus which inhibits the driver from having an uncomfortable feeling in spite of a large curvature of the lane when the vehicle travels round a curve.

Solution to Problem

A lane departure avoidance apparatus according to an aspect of the present invention includes a control performing unit performing control to acquire a position of a subject vehicle in a lane in which the subject vehicle is traveling and to prevent departure from the lane, from when a control start condition is satisfied until a control end condition is satisfied, a curvature acquiring unit acquiring a curvature of the lane, and a condition setting unit setting the control start condition and/or the control end condition based on the curvature acquired by the curvature acquiring unit.

The lane departure avoidance apparatus according to the present invention sets the control start condition and/or the control end condition as described above to allow suppression of a driver's uncomfortable feeling that a start timing and an end timing for control to prevent departure from the lane vary according to the curvature of the lane.

BRIEF DESCRIPTION OF THE DRAWINGS

FIG. 4 is a plan view illustrating a lateral position D, a threshold A, a lateral speed v, a yaw angle θ, a width W of a lane, and the like;

FIG. 8 is a plan view illustrating the lateral position D, a threshold B, and the like;

FIG. 12 is a plan view illustrating the lateral position D, the threshold B, the lateral speed v, the yaw angle θ, and the like;

DESCRIPTION OF THE EMBODIMENTS

Figure 1:
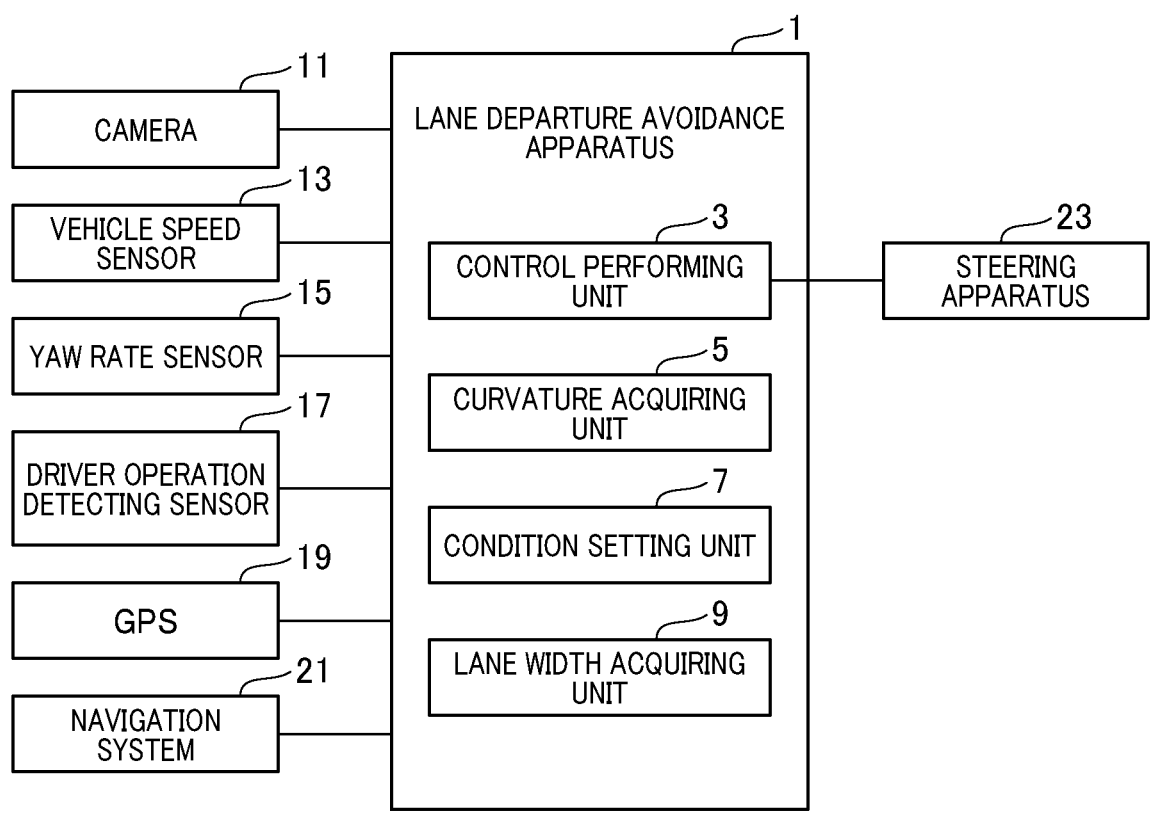
FIG. 1 is a block diagram illustrating a configuration of a lane departure avoidance apparatus.

Embodiments of the present invention will be described below with reference to the attached drawings. However, the present invention may be implemented in many different forms and should not be interpreted as being limited to the embodiments described herein. Rather, the embodiments are provided to make the disclosure of the present invention thorough and complete and to convey completely the scope of the present invention to those skilled in the art. Similar reference numerals denote similar components throughout the drawings.

First Embodiment

1. Configuration of the Lane Departure Avoidance Apparatus

A configuration of a lane departure avoidance apparatus 1 will be described based on FIG. 1. The lane departure avoidance apparatus 1 is an in-vehicle apparatus mounted in a vehicle. A vehicle in which the lane departure avoidance apparatus 1 is mounted is designated as a subject vehicle. The lane departure avoidance apparatus 1 is a well-known computer including a central processing unit (CPU), a random access memory (RAM), a read-only memory (ROM), and the like (not illustrated in the drawings). In the lane departure avoidance apparatus 1, the CPU executes programs stored in the ROM to execute various processes described below.

The lane departure avoidance apparatus 1 includes, as functional blocks, a control performing unit 3, a curvature acquiring unit 5, a condition setting unit 7, and a lane width acquiring unit 9. Functions of the units will be described below.

In addition to the lane departure avoidance apparatus 1, the subject vehicle includes a camera 11, a vehicle speed sensor 13, a yaw rate sensor 15, a driver operation detecting sensor 17, a GPS 19, a navigation system 21, and a steering apparatus 23. The camera 11 photographs the front of the subject vehicle to create an image. The vehicle speed sensor 13 detects a vehicle speed V of the subject vehicle. The yaw rate sensor 15 detects a yaw rate of the subject vehicle. The driver operation detecting sensor 17 detects a steering operation performed by a driver of the subject vehicle. The GPS 19 acquires position information on the subject vehicle. The navigation system 21 has a well-known route guiding function. The steering apparatus 23 acquires a steering torque from the lane departure avoidance apparatus 1 and uses the steering torque to steer the subject vehicle.

2. Processes Executed by the Lane Departure Avoidance Apparatus 1

Processes executed by the lane departure avoidance apparatus 1 will be described based on FIGS. 2 to 8.
(2-1) Control Start Determining Process
The lane departure avoidance apparatus 1 can perform steering control to acquire the position of the subject vehicle in a lane in which the subject vehicle is traveling and to prevent departure from the lane (this 6 control is hereinafter referred to as steering control). The steering control is performed from when a control start condition described below is satisfied until a control end condition described below is satisfied.

Figure 2:
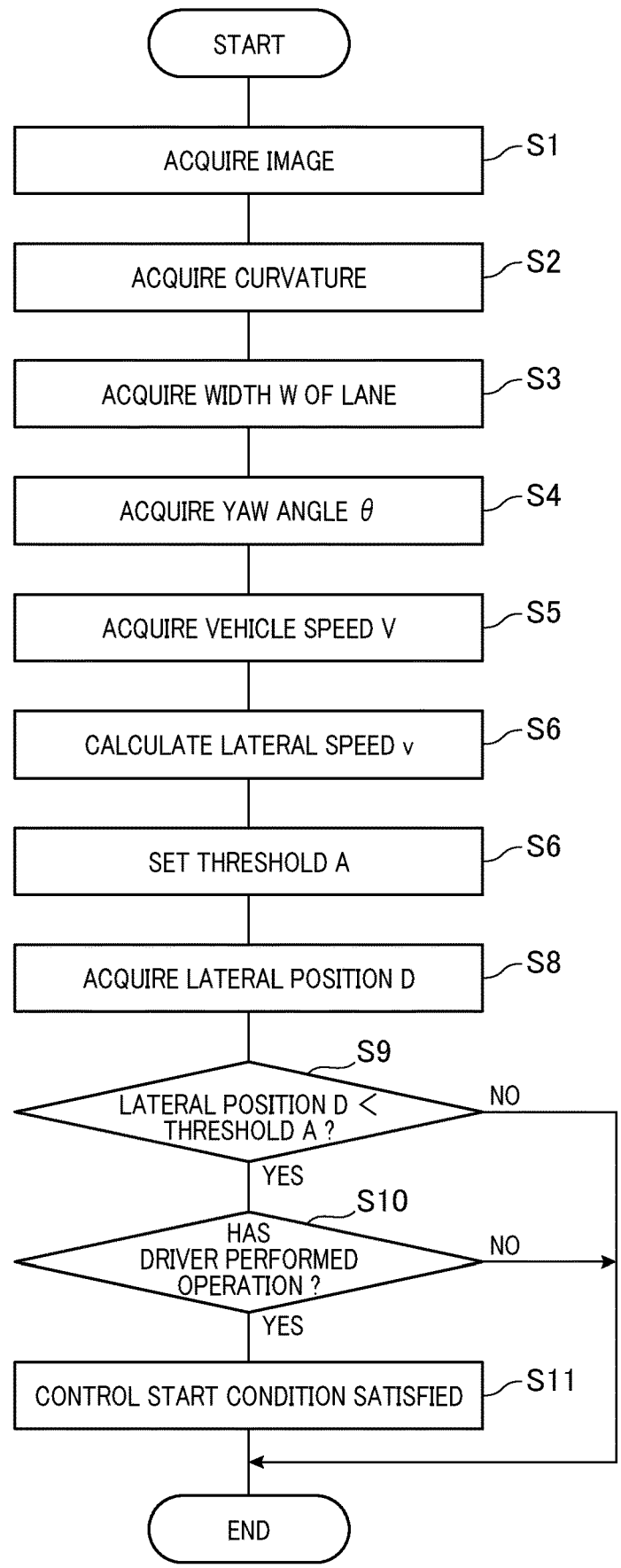
FIG. 2 is a flowchart illustrating a control start determination process executed by the lane departure avoidance apparatus.

The lane departure avoidance apparatus 1 repeatedly executes a control start determining process illustrated in FIG. 2 at predetermined time intervals while the steering control is not executed, and starts the steering control upon determining that the control start condition is satisfied in the process.

Figure 3:
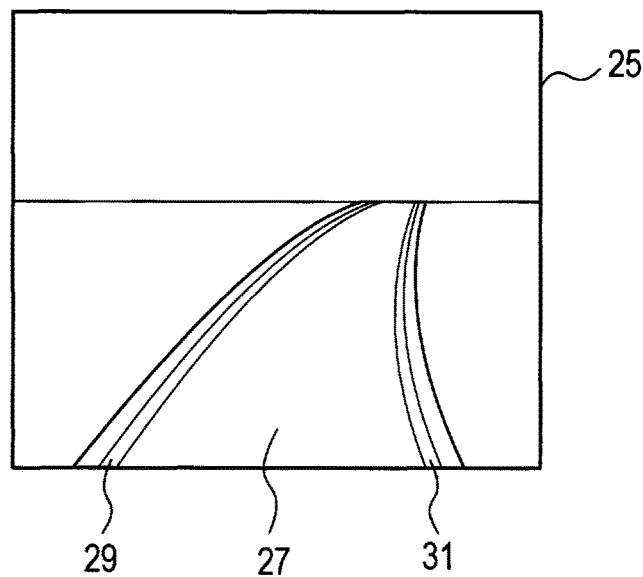
FIG. 3 is a diagram illustrating an image in front of a vehicle.

In step S1 in FIG. 2, the curvature acquiring unit 5 acquires an image using the camera 11. As illustrated in FIG. 3, the image 25 results from imaging of a scenery in front of the subject vehicle, and includes a lane 27 in which the subject vehicle is traveling and lane boundary lines 29 and 31 by which the lane 27 is bounded.

In step S2, the curvature acquiring unit 5 calculates curvatures of the lane boundary lines 29 and 31 using the image 25 acquired in the step S1. The curvatures of the lane boundary lines 29 and 31 mean the curvatures obtained when the lane 27 is viewed from above. The curvatures of the lane boundary lines 29 and 31 are equal to the curvature of the lane 27, and thus, the curvature calculated in the present step S may be referred to as the curvature of the lane 27. For the positive and negative values of the curvature, the curvature has a positive value when, in the image 25 illustrated in FIG. 3, the lane 27 bends leftward, and has a negative value when the lane 27 bends rightward.

Figure 4:
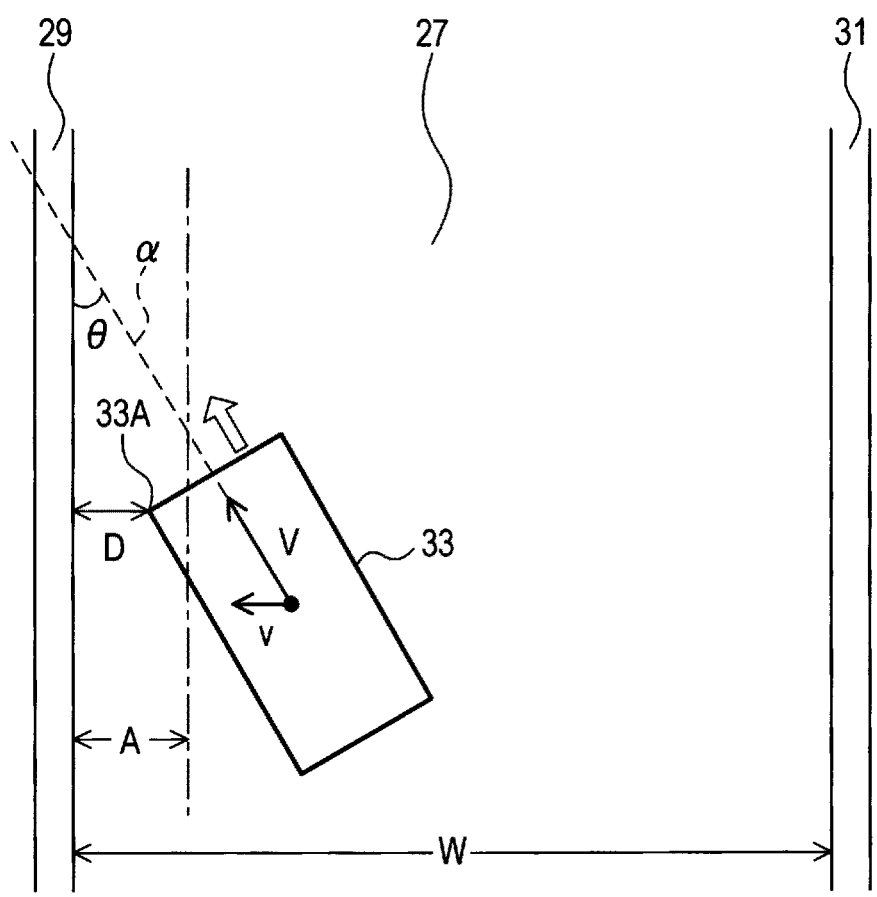

In step S3, the lane width acquiring unit 9 acquires the width W of the lane using the image acquired in the step S1. As illustrated in FIG. 4, the width W of the lane is a distance between the lane boundary lines 29 and 31 in a lateral direction of the lane 27 (the direction of the lane 27 orthogonal to a traveling direction).

In step S4, the condition setting unit 7 calculates a yaw angle $\theta$ of the subject vehicle based on positions and orientations of the lane boundary lines 29 and 31 in the image acquired in the step S1. As illustrated in FIG. 4, the yaw angle $\theta$ is an angle formed between the traveling direction a of the subject vehicle 33 and the lane boundary lines 29 and 31.

A change in the yaw angle $\theta$ accordingly changes the positions and orientations of the lane boundary lines 29 and 31 in the image 25. The condition setting unit 7 is pre-provided with a map which defines the relationship between the yaw angle $\theta$ and the positions and the orientations of the lane boundary lines 29 and 31, and calculates the yaw angle $\theta$ by inputting the positions and orientations of the lane boundary lines 29 and 31 in the image 25 to the map.

In step S5, the condition setting unit 7 acquires the vehicle speed V of the subject vehicle using the vehicle speed sensor 13.

In step S6, the condition setting unit 7 calculates a lateral speed v of the subject vehicle using the yaw angle $\theta$ calculated in the step S4 and the vehicle speed V acquired in the step S5. As illustrated in FIG. 4, the lateral speed v is a component of the vehicle speed V which acts in the lateral direction in the lane 27. Specifically, the condition setting unit 7 calculates the lateral speed v by multiplying the vehicle speed V by $\sin \theta$. For the positive and negative values of the lateral speed v, the lateral speed v in a direction toward one of the lane boundary lines 29 and 31 which is closer to the subject vehicle 33 (in FIG. 4, the lane boundary line 29) is assumed to have a positive value, and the lateral speed v in the opposite direction is assumed to have a negative value.

In step S7, the condition setting unit 7 sets a threshold A which is a threshold relating to a distance. The condition setting unit 7 is pre-provided with a map which outputs the threshold A when the curvature, the lateral speed v, and the width W of the lane 27 are input to the map. The condition setting unit 7 inputs, to the map, the curvature acquired in the step S2, the width W of the lane 27 acquired in the step S3, and the lateral speed v calculated in the step S6, to obtain the threshold A. That is, the condition setting unit 7 sets the threshold A (an example of the control start condition) based on the curvature, the width W of the lane 27, and the lateral speed v.

Figure 5A:
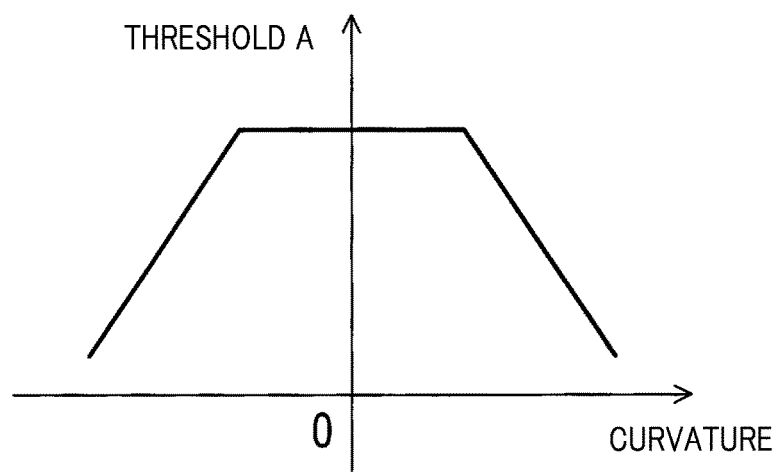
FIG. 5A is a graph illustrating a relationship between a curvature and the threshold A.
Figure 5B:
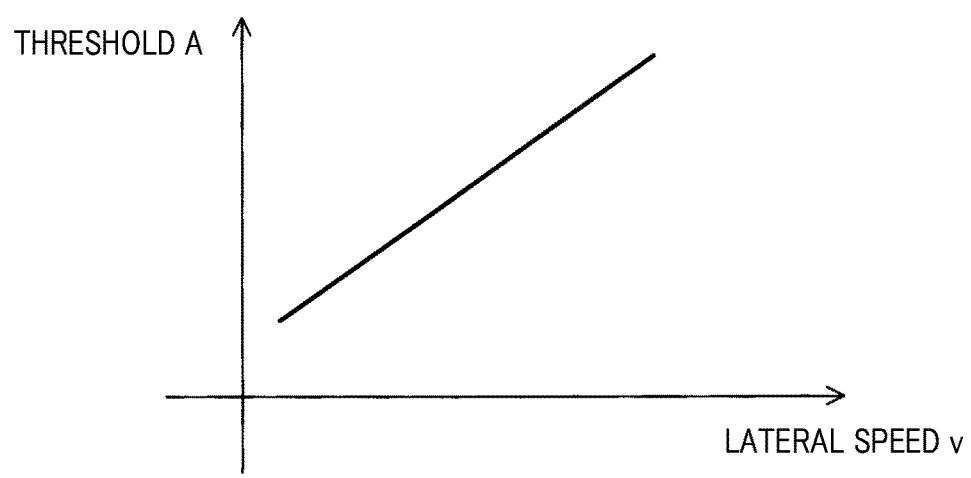
FIG. 5B is a graph illustrating a relationship between the lateral speed v and the threshold A.
Figure 5C:
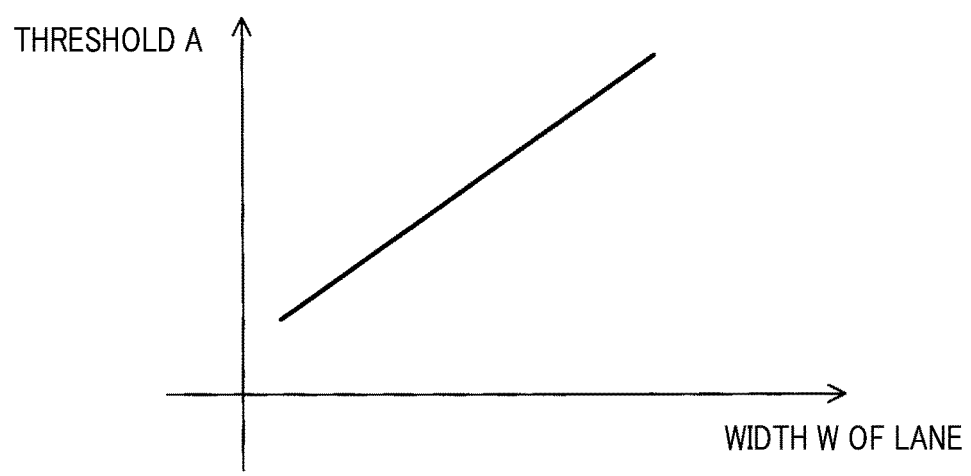
FIG. 5C is a graph illustrating a relationship between the width W of the lane and the threshold A.

Characteristics of the above-described map are as follows. When the width W of the lane 27 and the lateral speed v are constant, the threshold A decreases with increasing absolute value of the curvature as illustrated in FIG. 5A. Furthermore, when the curvature and the width W of the lane 27 are constant, the threshold A increases consistently with the lateral speed v as illustrated in FIG. 5B. Furthermore, when the curvature and the lateral speed v are constant, the threshold A increases consistently with the width W of the lane 27 as illustrated in FIG. 5C. In any case, the threshold A is a positive value.

In step S8, the control performing unit 3 acquires a lateral position D of the subject vehicle using the image 25 acquired in the step S1. As illustrated in FIG. 4, the lateral position D is a distance in the lateral position D between one of the lane boundary lines 29 and 31 which is closer to the subject vehicle 33 (in FIG. 4, the lane boundary line 29) and a portion 33A of the subject vehicle 33 which is the closest to the lane boundary line closer to the subject vehicle 33. As illustrated in FIG. 4, the lateral position D has a positive value when the portion 33A is inside the lane 27, and has a negative value when the portion 33A is outside the lane 27.

In step S9, the control performing unit 3 compares the threshold A set in the step S7 with the lateral position D acquired in the step S8. As illustrated in FIG. 4, the present process proceeds to step S10 if the lateral position D is smaller than the threshold A, and ends if the lateral position D is equal to or larger than the threshold A.

In step S10, the control performing unit 3 detects a steering operation performed by the driver of the subject vehicle using the driver operation detecting sensor 17. The present process proceeds to step S11 if no steering operation has been performed, and ends if a steering operation has been performed.

In step S11, the control performing unit 3 determines that the control start condition is satisfied. Subsequently, the control performing unit 3 starts the steering control. The steering control continues until the control end condition is satisfied.

(2-2) Steering Control

The steering control performed by the control performing unit 3 is well-known control, and thus, detailed description of the steering control is omitted and an outline thereof will be given. The control performing unit 3 first sets a target value of the position (the lateral position D) of the subject vehicle in the lane 27 and a target value of the lateral speed v under the assumption that the lane 27 is a straight line. The target value of the lateral position D is larger than the threshold A and a threshold B described below. The target value of the lateral speed v has a sufficiently small absolute value.

Then, the control performing unit 3 calculates a steering torque (hereinafter referred to as a first steering torque) needed to reach the target value of the lateral position D and the target value of the lateral speed v (a feedforward process). The lateral position D, the lateral speed v, the yaw rate, and the like obtained at a current point in time are used for this calculation.

Then, the control performing unit 3 acquires the shape of the lane 27 in front of the subject vehicle (whether the lane 27 is bent rightward or leftward and the magnitude of the curvature) using the image 25, and calculates a steering torque needed to travel along the lane 27 (hereinafter referred to as a second steering torque).

Then, the control performing unit 3 calculates a final steering torque by adding up the first steering torque and the second steering torque. The control performing unit 3 outputs the steering torque to the steering apparatus 23. The steering apparatus 23 steers the subject vehicle using the steering torque.

Furthermore, the control performing unit 3 periodically calculates differences between the target value and an actual value of the lateral position D and between the target value and an actual value of the lateral speed v, and increases or reduces the steering torque as needed to enable a reduction in the differences (a feedback process). The above-described steering control allows for steering in a direction in which the subject vehicle 33 is prevented from departing from the lane 27.

(2-3) Control End Determining Process

Figure 6:
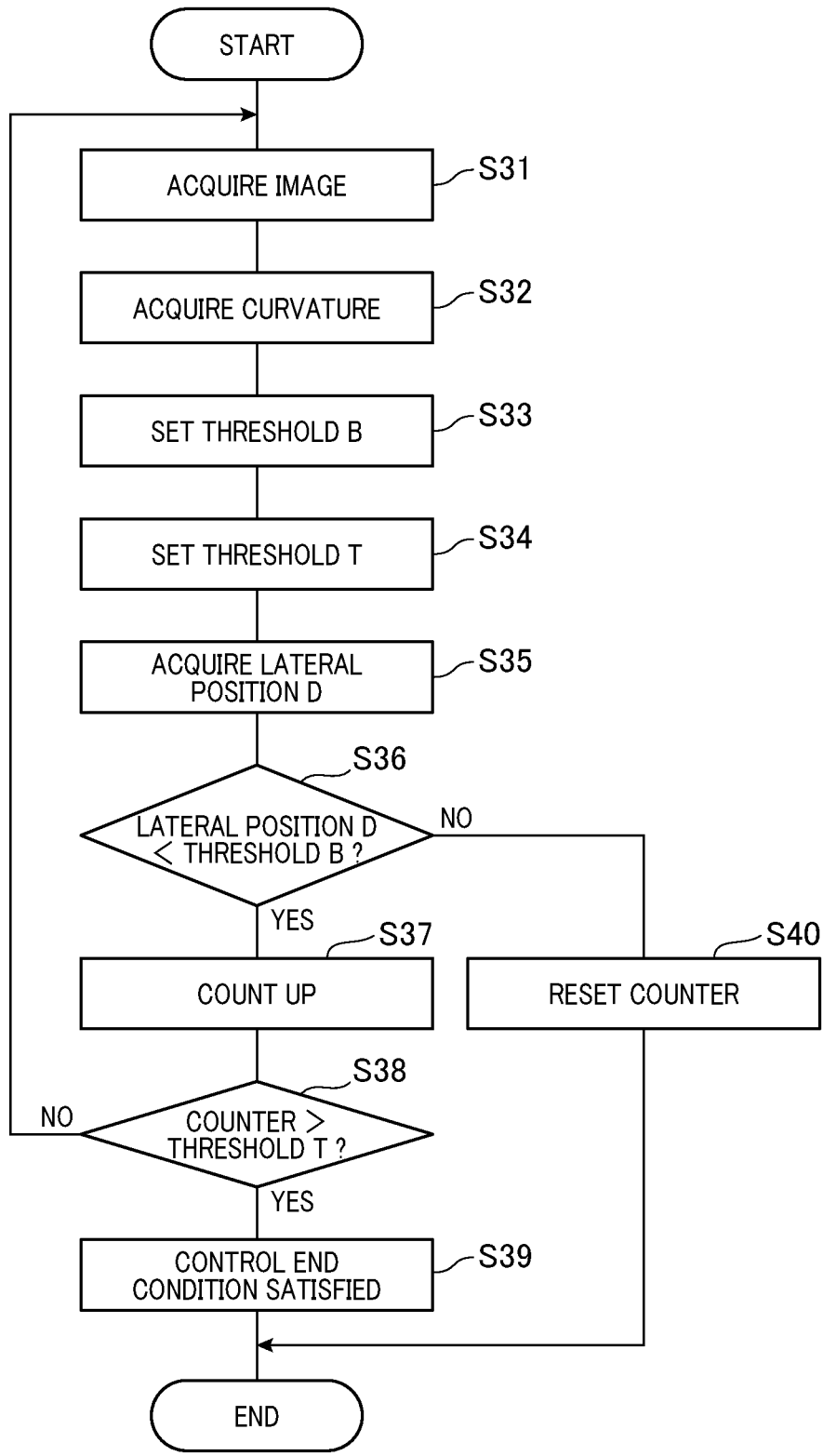
FIG. 6 is a flowchart illustrating a control end determining process executed by the lane departure avoidance apparatus.

The lane departure avoidance apparatus 1 repeatedly executes a control end determining process illustrated in FIG. 6 at predetermined time intervals while the steering control is being performed, and ends the steering control upon determining that the control end condition is satisfied.

In step S31 in FIG. 6, the curvature acquiring unit 5 acquires the image illustrated in FIG. 3 using the camera 11.

In step S32, the curvature acquiring unit 5 calculates the curvature of the lane 27 using the image 25 acquired in the step S31.

In step S33, the condition setting unit 7 sets the threshold B, which is a threshold relating to distance. The threshold B is a positive number and has a fixed value. The threshold B is a larger value than the threshold A.

Figure 7:
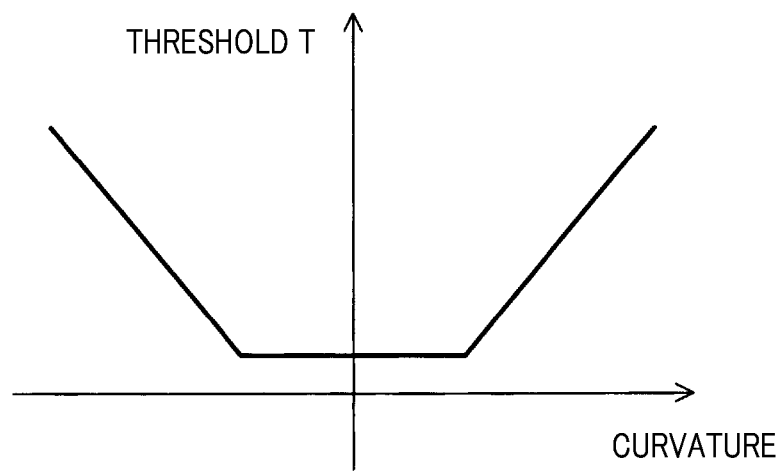
FIG. 7 is a graph illustrating a relationship between the curvature and a threshold T.

In step S34, the condition setting unit 7 sets a threshold T which is a threshold relating to time. The condition setting unit 7 is pre-provided with a map which outputs the threshold T when the curvature is input to the map. The condition setting unit 7 inputs the curvature acquired in the step S32 to the map to obtain the threshold T. That is, the condition setting unit 7 sets the threshold T (an example of the control end condition) based on the curvature. Characteristics of the above-described map are such that the threshold T increases consistently with the absolute value of the curvature as illustrated in FIG. 7.

Figure 8:
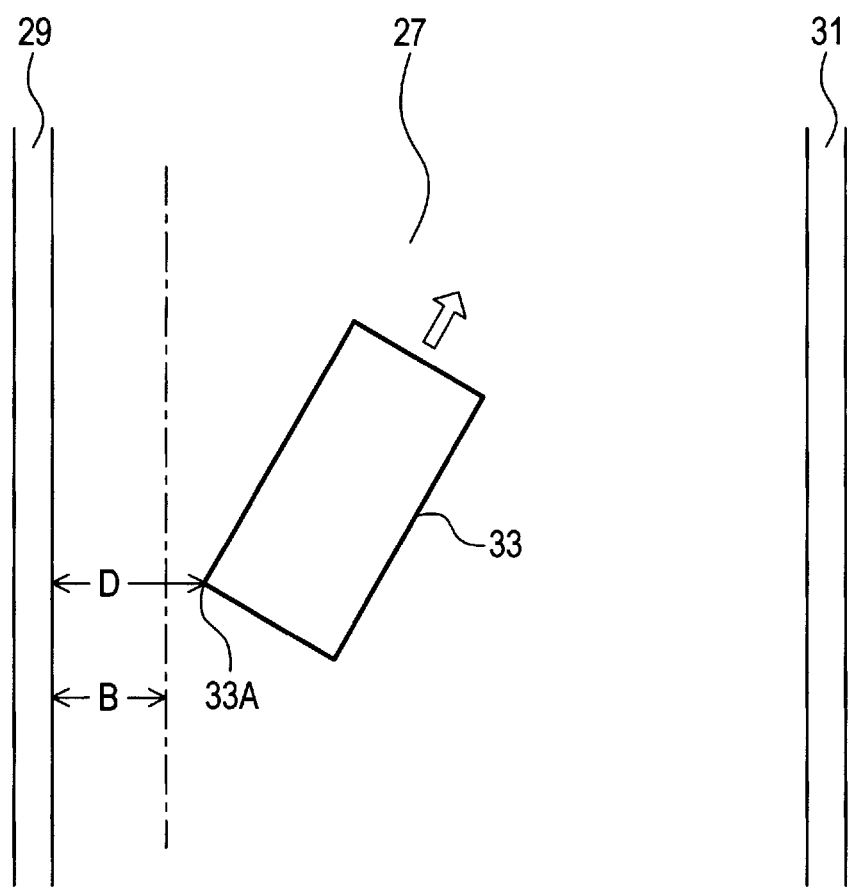

In step S35, the control performing unit 3 acquires the lateral position D of the subject vehicle using the image 25 acquired in the step S31. As illustrated in FIG. 8, the lateral position D is a distance in the lateral direction between one of the lane boundary lines 29 and 31 which is closer to the subject vehicle 33 (in FIG. 8, the lane boundary line 29) and the portion 33A of the subject vehicle 33 which is the closest to the lane boundary line closer to the subject vehicle 33.

In step S36, the control performing unit 3 compares the threshold B set in the step S33 with the lateral position D acquired in the step S35. As illustrated in FIG. 8, the present process proceeds to step S37 if the lateral position D is larger than the threshold B, and proceeds to step S40 if the lateral position D is equal to or smaller than the threshold A.

In step S37, the control performing unit 3 counts up a counter (an accumulated time) in a timer. The counter is an accumulated time starting at a point in time when the counter is reset in step S40 described below. The counter means a duration of a state where the lateral position D is larger than the threshold B.

In step S38, the control performing unit 3 compares the counter counted up in the step S37 with the threshold T set in the step S34. If the counter is larger than the threshold T (if the duration of the state where the lateral position D is larger than the threshold B is longer than the threshold T), the process proceeds to step S39. If the counter is equal to or smaller than the threshold T, the process proceeds to step S31.

In step S39, the control performing unit 3 determines that the control end condition is satisfied. Subsequently, the control performing unit 3 ends the ongoing steering control.

On the other hand, upon making a negative determination in the step S36, the control performing unit 3 resets the counter (sets the counter back to zero) in step S40.

3. Effects of the Present Embodiment (1A) The lane departure avoidance apparatus 1 sets the control start condition more severe in keeping with an increase in the curvature of the 6 lane 27. That is, in keeping with an increase in the curvature of the lane 27, the threshold A is set smaller to make the control start condition less likely to be satisfied.

In general, a larger curvature of the lane 27 makes the control start condition more likely to be satisfied, leading to the likelihood of an earlier start timing for the steering control. By setting the threshold A as described above, the lane departure avoidance apparatus 1 can suppress the driver's uncomfortable feeling that the start timing for the steering control varies according to the curvature of the lane 27.

(1B) The lane departure avoidance apparatus 1 sets the control end condition more severe in keeping with an increase in the curvature of the lane. That is, in keeping with an increase in the curvature of the lane 27, the threshold T is set larger to make the control end condition less likely to be satisfied.

In general, a larger curvature of the lane 27 makes the control end condition more likely to be satisfied, leading to the likelihood of an earlier end timing for the steering control. By setting the threshold T as described above, the lane departure avoidance apparatus 1 can suppress the driver's uncomfortable feeling that the end timing for the steering control varies according to the curvature of the lane 27.

(1C) The lane departure avoidance apparatus 1 sets the threshold A smaller in keeping with a decrease in the width W of the lane 27. In general, a narrower width W of the lane 27 makes the control start condition more likely to be satisfied, leading to the likelihood of an earlier start timing for the steering control. By setting the threshold A smaller in keeping with a decrease in the width W of the lane W, the lane departure avoidance apparatus 1 can suppress the driver's uncomfortable feeling that the start timing for the steering control varies according to the narrowness of the width W of the lane 27.

Second Embodiment

1. Differences from the First Embodiment

A second embodiment has a basic configuration similar to the basic configuration of the first embodiment. Thus, description of common parts of the configuration is omitted, and differences from the first embodiment will mainly be described.

Figure 9:
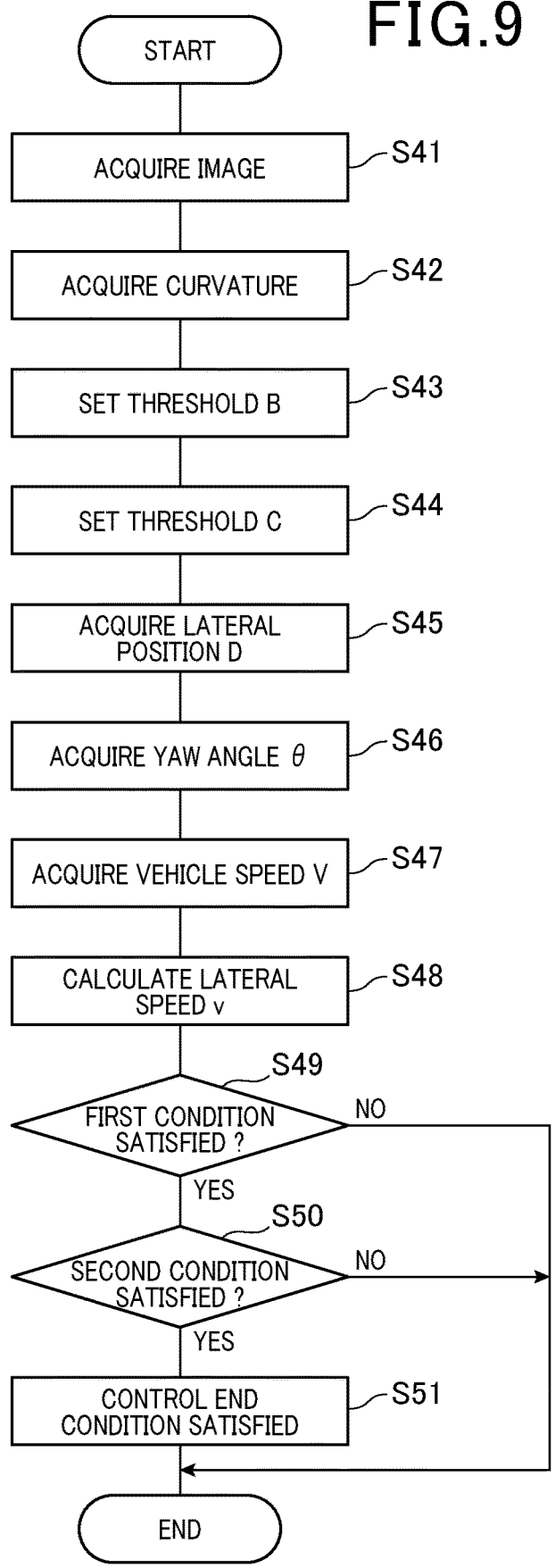
FIG. 9 is a flowchart illustrating a control end determining process executed by the lane departure avoidance apparatus.

According to the second embodiment, a control end determining process illustrated in FIG. 9 is repeatedly executed at predetermined time intervals while the steering control is being performed, and the steering control is ended when the control end condition is determined to be satisfied.

In step S41 in FIG. 9, the curvature acquiring unit 5 acquires the image 25 illustrated in FIG. 3 using the camera 11.

In step S42, the curvature acquiring unit 5 calculates the curvature of the lane 27 using the image 25 acquired in the step S41.

Figure 10:
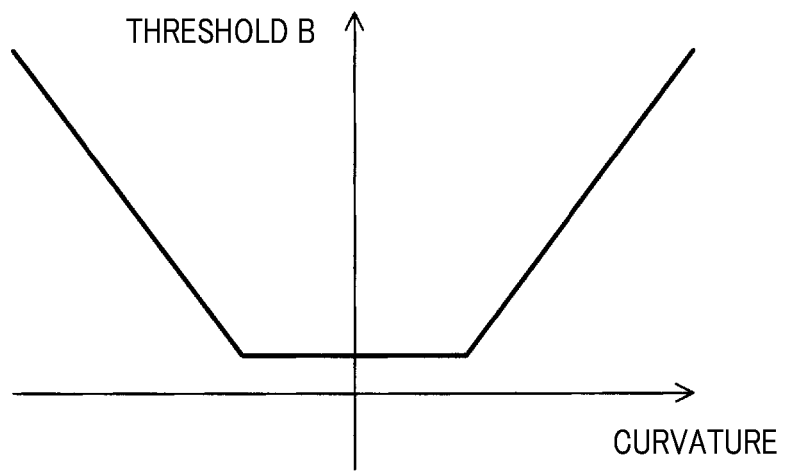
FIG. 10 is a graph illustrating a relationship between the curvature and the threshold B.

In step S43, the condition setting unit 7 sets the threshold B, which is a threshold relating to the lateral position D. The condition setting unit 7 is pre-provided with a map which outputs the threshold B when the curvature is input to the map. The condition setting unit 7 inputs the curvature acquired in the step S42 to the map to obtain the threshold B. That is, the condition setting unit 7 sets the threshold B (an example of the control end condition) based on the curvature. Characteristics of the above-described map are such that the threshold B increases consistently with the absolute value of the curvature as illustrated in FIG. 10.

Figure 11:
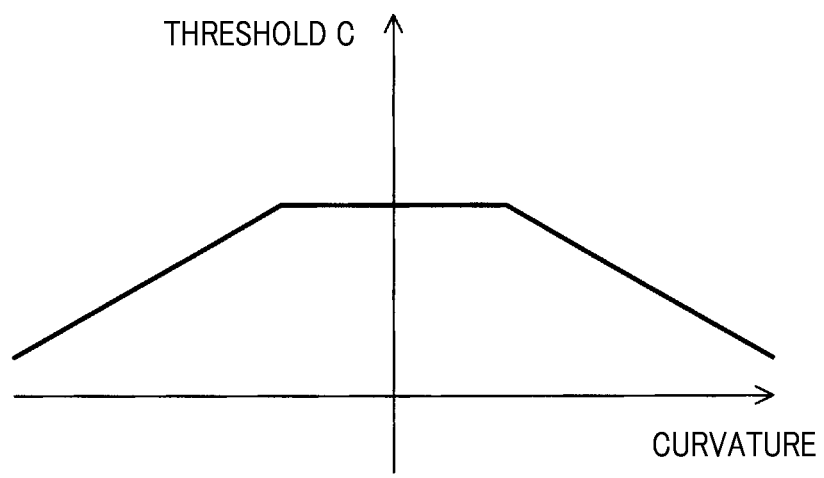
FIG. 11 is a graph illustrating a relationship between the curvature and a threshold C.

In step S44, the condition setting unit 7 sets a threshold C relating to the lateral speed v. The condition setting unit 7 is pre-provided with a map which outputs the threshold C when the curvature is input to the map. The condition setting unit 7 inputs the curvature acquired in the step S42 to the map to obtain the threshold C. That is, the condition setting unit 7 sets the threshold C (an example of the control end condition) based on the curvature. Characteristics of the above-described map are such that the threshold C decreases with increasing absolute value of the curvature as illustrated in FIG. 11.

Figure 12:
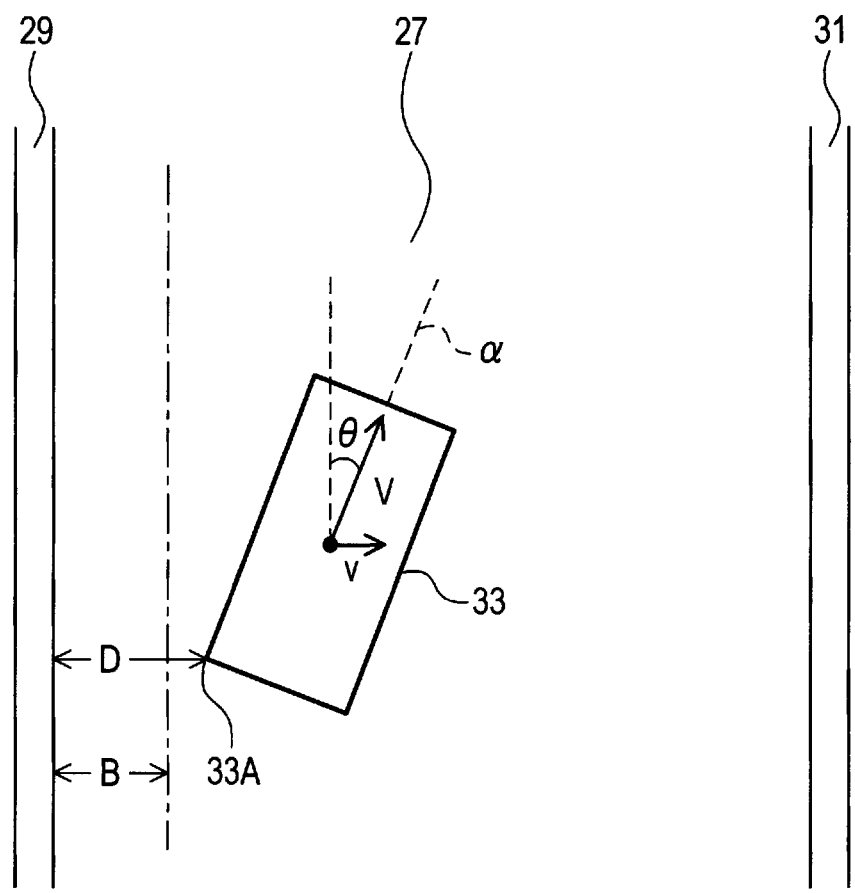

In step S45, the control performing unit 3 acquires the lateral position D of the subject vehicle using the image 25 acquired in the step S41. As illustrated in FIG. 12, the lateral position D is a distance in the lateral direction between one of the lane boundary lines 29 and 31 which is closer to the subject vehicle 33 (in FIG. 12, the lane boundary line 29) and the portion 33A of the subject vehicle 33 which is the closest to the lane boundary line closer to the subject vehicle 33.

In step S46, the condition setting unit 7 calculates the yaw angle θ of the subject vehicle based on the positions and orientations of the lane boundary lines 29 and 31 in the image 25 acquired in the step S41. The yaw angle is an angle formed between the traveling direction a of the subject vehicle 33 and the lane boundary lines 29 and 31.

In step S47, the condition setting unit 7 acquires the vehicle speed V of the subject vehicle using the vehicle speed sensor 13.

In step S48, the condition setting unit 7 calculates the lateral speed v of the subject vehicle using the yaw angle θ calculated in the step S46 and the vehicle speed V acquired in the step S47.

In step S49, the control performing unit 3 determines whether or not a first condition is satisfied. The first condition relates to the lateral position D and is that the lateral position D acquired in the step S45 is larger than the threshold B set in the step S43. The process proceeds to step S50 if the first condition is satisfied, and ends if the first condition is not satisfied.

In step S50, the control performing unit 3 determines whether or not a second condition is satisfied. The second condition relates to the lateral speed v and is that the lateral speed v calculated in the step S48 is smaller than the threshold C set in the step S44. The process proceeds to step S51 if the second condition is satisfied, and ends if the second condition is not satisfied.

In step S51, the control performing unit 3 determines that the control end condition is satisfied. Subsequently, the control performing unit 3 ends the ongoing steering control.

2. Effects of the Present Embodiment

According to the second embodiment described above in detail, in addition to the above-described effects (1A) and (1C) of the first embodiment, the following effects are produced.

(2A) The lane departure avoidance apparatus 1 sets the control end 6 condition more severe in keeping with an increase in the curvature of the lane 27. That is, in keeping with an increase in the curvature of the lane 27, the threshold B is set larger and the threshold C is set smaller to make the control end condition less likely to be satisfied.

In general, a larger curvature of the lane 27 makes the control end condition more likely to be satisfied, leading to the likelihood of an earlier end timing for the steering control. By setting the threshold B and the threshold C as described above, the lane departure avoidance apparatus 1 can suppress the driver's uncomfortable feeling that the end timing for the steering control varies according to the curvature of the lane 27.

Other Embodiments

The embodiments of the present invention have been described. However, the present invention is not limited to the above-described embodiments and may take various forms.

Figure 13:
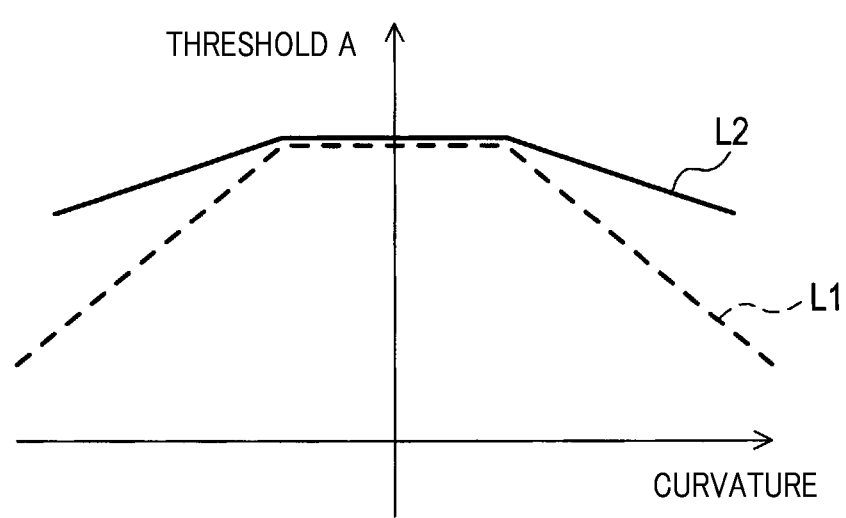
FIG. 13 is a graph illustrating the relationship between the curvature and the threshold A observed when a subject vehicle is inside a curve and when the subject vehicle is outside the curve.

(1) In the above-described first and second embodiments, the control start condition may be less likely to be satisfied when the subject vehicle is inside a curve than when the subject vehicle is outside the curve. For example, as illustrated in FIG. 13, when the subject vehicle is inside the curve, the relationship between the curvature of the lane 27 and the threshold A may be as represented by L1. When the subject vehicle is outside the curve, the relationship between the curvature of the lane 27 and the threshold A may be as represented by L2. In this case, given the same curvature, the threshold A is smaller (the control start condition is less likely to be satisfied) when the subject vehicle is inside the curve than when the subject vehicle is outside the curve.

In general, when the subject vehicle is inside the curve, the control start condition is much more likely to be satisfied, leading to the likelihood of a much earlier start timing for the steering control. Setting the threshold A as described above allows suppression of an excessively early start timing for the steering control when the subject vehicle is inside the curve.

(2) In the above-described first and second embodiments, the lane departure avoidance apparatus 1 may acquire the curvature of the lane 27 using another method. For example, map information indicative of curvatures stored for respective locations may be pre-held to allow the curvature corresponding to position information on the subject vehicle acquired through the GPS 19 to be read from the map information.

Figure 14A:
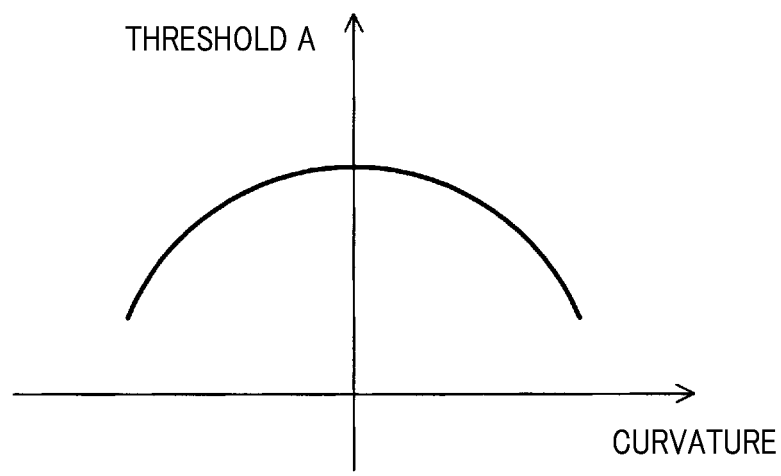
FIG. 14A is a graph illustrating the relationship between the curvature and the threshold A.
Figure 14B:
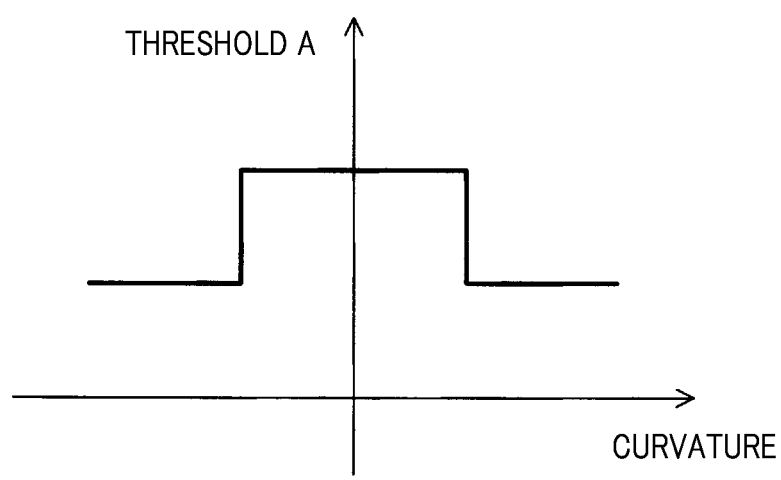
FIG. 14B is a graph illustrating the relationship between the curvature and the threshold A.

(3) In the above-described first and second embodiments, the aspect where the threshold A is set smaller in keeping with an increase in the curvature may be changed to a different aspect. For example, aspects illustrated in FIGS. 14A and 14B may be used. The aspect where the threshold A is set smaller in keeping with an increase in the curvature includes an aspect where the threshold A varies throughout the range of the curvature and an aspect where the threshold A varies within a part of the range of the curvature and is constant within the remaining part of the range of the curvature.

Figure 15A:
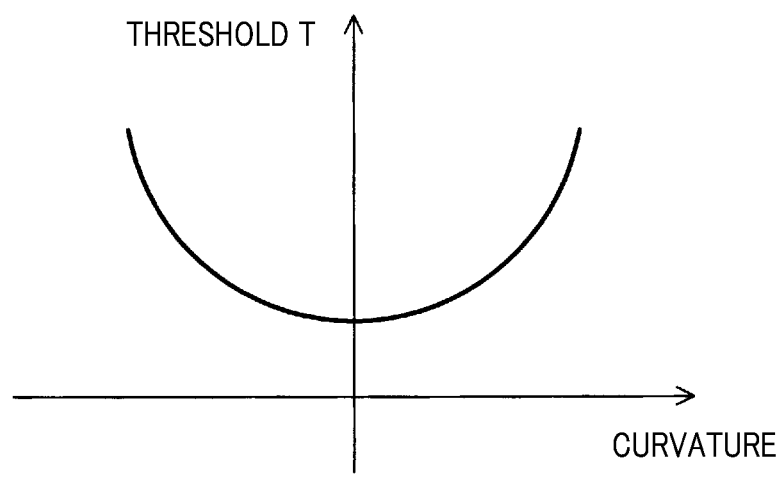
FIG. 15A is a graph illustrating the relationship between the curvature and the threshold T.
Figure 15B:
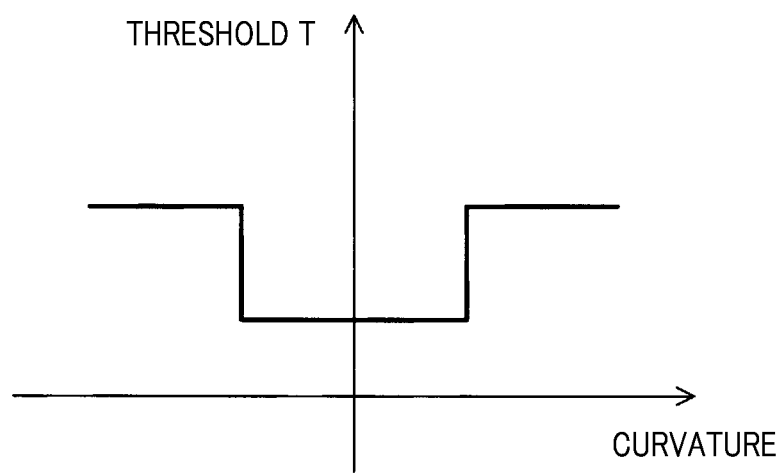
FIG. 15B is a graph illustrating the relationship between the curvature and the threshold T.

(4) In the above-described first embodiment, the aspect where the threshold T is set larger in keeping with an increase in the curvature may be changed to a different aspect. For example, aspects illustrated in FIGS. 15A and 15B may be used. The aspect where the threshold T is set larger in keeping with an increase in the curvature includes an aspect where the 6 threshold T varies throughout the range of the curvature and an aspect where the threshold T varies within a part of the range of the curvature and is constant within the remaining part of the range of the curvature.

Figure 16A:
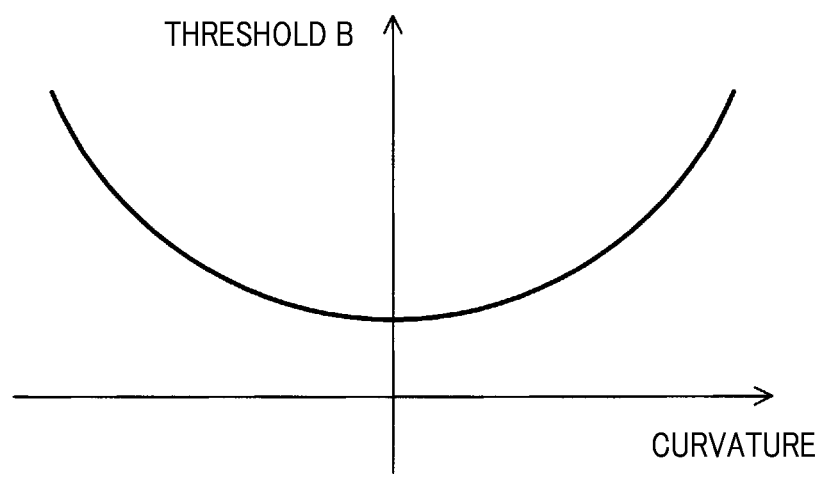
FIG. 16A is a graph illustrating the relationship between the curvature and the threshold B.
Figure 16B:
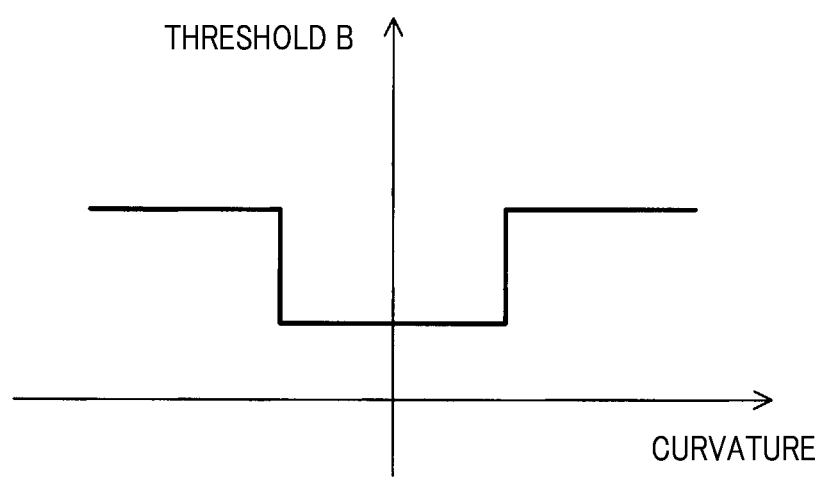
FIG. 16B is a graph illustrating the relationship between the curvature and the threshold B.

(5) In the above-described second embodiment, the aspect where the threshold B is set larger in keeping with an increase in the curvature may be changed to a different aspect. For example, aspects illustrated in FIGS. 16A and 16B may be used. The aspect where the threshold B is set larger in keeping with an increase in the curvature includes an aspect where the threshold B varies throughout the range of the curvature and an aspect where the threshold B varies within a part of the range of the curvature and is constant within the remaining part of the range of the curvature.

Figure 17A:
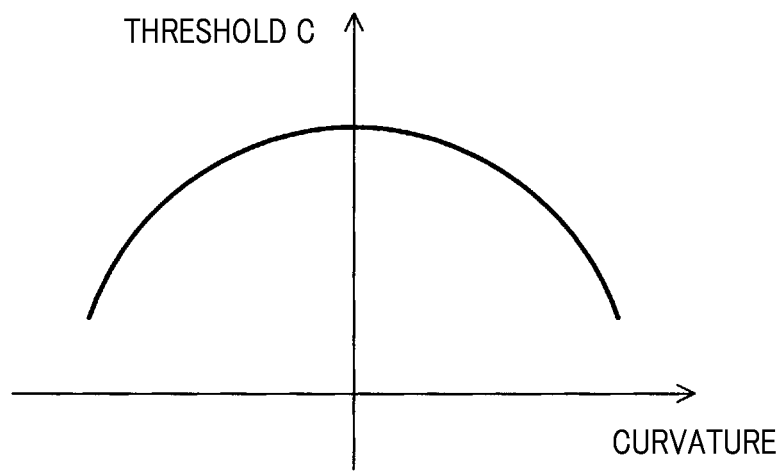
FIG. 17A is a graph illustrating the relationship between the curvature and the threshold C.
Figure 17B:
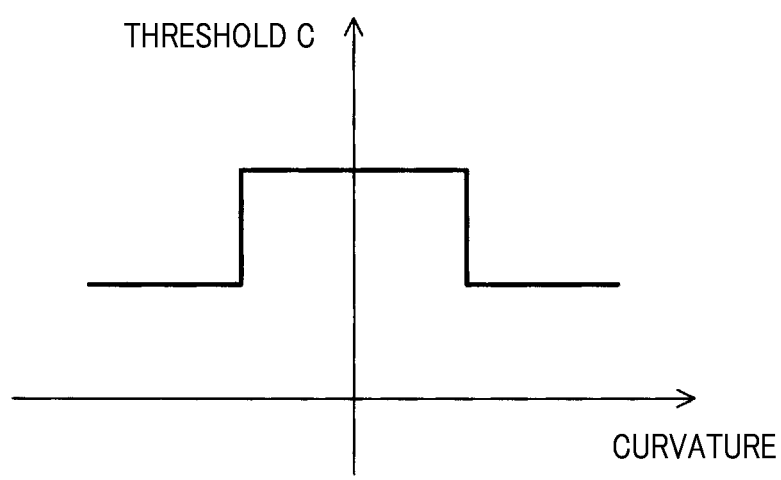
FIG. 17B is a graph illustrating the relationship between the curvature and the threshold C.

(6) In the above-described second embodiment, the aspect where the threshold C is set smaller in keeping with an increase in the curvature may be changed to a different aspect. For example, aspects illustrated in FIGS. 17A and 17B may be used. The aspect where the threshold C is set smaller in keeping with an increase in the curvature includes an aspect where the threshold C varies all over the range of the curvature and an aspect where 6 the threshold C varies within a part of the range of the curvature and is constant within the remaining part of the range of the curvature.

(7) In the above-described first and second embodiments, the lane departure avoidance apparatus 1 may set one of the control start condition and the control end condition based on the curvature, while fixing the other.

(8) In the above-described second embodiment, the lane departure avoidance apparatus 1 may set one of the threshold B and the threshold C based on the curvature, while fixing the other.

(9) In the above-described first embodiment, the threshold B may be a value varying according to the curvature like the threshold B in the above-described second embodiment.

(10) In the above-described first and second embodiments, the threshold A may be constant regardless of a variation in the width W of the lane 27.

(11) In the above-described first and second embodiments, the condition setting unit 7 may set the control start condition and/or the control end condition less severe (set the control start condition and/or the control end condition more likely to be satisfied) in keeping with an increase in the curvature acquired in the step S2. For example, the control start condition may be set less severe by setting the threshold A larger in keeping with an increase in the absolute value of the curvature. Alternatively, the control end condition may be set less severe by setting the threshold T smaller in keeping with an increase in the absolute value of the curvature. Alternatively, the control end condition may be set less severe by setting the threshold B smaller and setting the threshold C larger, in keeping with an increase in the absolute value of the curvature.

(12) In the above-described first and second embodiments, the process may always proceed to the step S11 if an affirmative determination is made in the step S9.

(13) The function of one component according to the above-described embodiments may be distributed as a plurality of components or the functions of a plurality of components may be integrated into one component. Furthermore, at least a part of the configuration according to the above-described embodiments may be replaced with a well-known configuration having similar functions. Furthermore, a part of the configuration according to the above-described embodiments may be omitted. Furthermore, at least a part of the configuration according to any of the above-described embodiments may be added to or replaced with the configuration according to another of the above-described embodiments. All the aspects included in technical ideas identified only by the language recited in the claims are the embodiments of the present invention.

(14) The present invention can be realized in various forms besides the above-described lane departure avoidance apparatus, such as an apparatus including the lane departure avoidance apparatus as a component, a program for allowing a computer to function as the lane departure avoidance apparatus, a medium having the program recorded therein, and a lane departure avoidance method.

The invention claimed is:

1. A lane departure avoidance apparatus comprising:
   a non-transitory data store storing processor-executable instructions; and
   one or more computer processors configured to execute the processor-executable instructions to:
      perform control to acquire a position of a subject vehicle in a lane in which the subject vehicle is traveling and to prevent departure of the subject vehicle from the lane, from when a control start condition is satisfied until a control end condition is satisfied;
      acquire a curvature of the lane; and
      set the control start condition and the control end condition based on the acquired curvature,
   wherein:
      the control start condition is that a distance in a lateral direction between a lane boundary line and the subject vehicle is less than a first threshold,
      the control end condition is that a first condition relating to the distance between the lane boundary line and the subject vehicle in the lateral direction and a second condition relating to a lateral speed of the subject vehicle are both satisfied, and
   the one or more computer processors are further configured to execute the processor-executable instructions to:
      set the first threshold to decrease with an increasing curvature of the lane, and
      set the first condition and/or the second condition to increase with the increasing curvature of the lane.

2. The lane departure avoidance apparatus according to claim 1, wherein the one or more computer processors are further configured to execute further processor-executable instructions to:
   acquire a width of the lane, and
   set the first threshold to decrease with a decrease in the width of the lane.

3. The lane departure avoidance apparatus according to claim 1, wherein:
   the one or more computer processors are further configured to execute further processor-executable instructions to set the first condition and/or the second condition relative to the increase in the curvature of the lane.

4. The lane departure avoidance apparatus according to claim 1, wherein:
   the control end condition is that a duration of a state where a distance between the lane boundary line and the subject vehicle in the lateral direction is larger than a second threshold, and
   the one or more computer processors are further configured to execute further processor-executable instructions to set the second threshold larger relative to the increase in the acquired curvature.

* * * * *